United States Patent

[11] 3,556,056

[72] Inventor Glenn O. Baker
   1224 N. Home Road, R.R. 3, Mansfield, Ohio 44903
[21] Appl. No. 790,971
[22] Filed Jan. 14, 1969
[45] Patented Jan. 19, 1971

[54] CLAMSHELL TROPICAL FISH FEEDER
   1 Claim, 2 Drawing Figs.
[52] U.S. Cl. .................................................. 119/51
[51] Int. Cl. .............................................. A01k 61/02
[50] Field of Search ................................. 119/51, 5, 52

[56] References Cited
   UNITED STATES PATENTS
   1,055,082   3/1913   Rogers .......................... 119/5
   1,976,962   10/1934  Pape ............................. 119/52
   2,718,211   9/1955   Pettas ........................... 119/51

*Primary Examiner*—Hugh R. Chamblee

ABSTRACT: A device for feeding fish in a home aquarium, having a symmetric base with floral leaves and coral. An open clamshell at the bottom on top of the base provides a feeding area for fish, the food being placed in the flower portion of the device at the top.

PATENTED JAN 19 1971

3,556,056

INVENTOR.
Glenn O. Baker

CLAMSHELL TROPICAL FISH FEEDER

This invention relates to feeding devices for tropical fish, and more particularly to an adjustable and decorative clamshell feeding device.

It is therefore the main purpose of this invention to provide a clamshell tropical-fish feeder which will have a cement base with extending coral leaves and an open clamshell from which the fish will eat the food that descends into the clamshell.

Another object of this invention is to provide a tropical-fish feeder which will have the upper portions of the clamshell attached to a sleeve in which a second sleeve is telescopingly received in order to adjust the height of the device for various size aquariums.

A further object of this invention is to provide a tropical-fish feeder which will have a leaf arrangement around the coral sleeve for further decorative purposes and the flower portion attached to the inner sleeve will have hollow stem extending across the flower with small openings in the stem to allow for air to bubble the water and help the feed or food particles to be followed down to the clamshell portion of the device and the stem will also serve to make the device self-cleaning.

Other objects of this invention are to provide a clamshell tropical-fish feeder which is simple in design, inexpensive to manufacture, rugged in construction, easy to use and efficient in operation.

These and other objects will become readily apparent upon a study of the following specification together with the accompanying drawing wherein.

Figure 1:
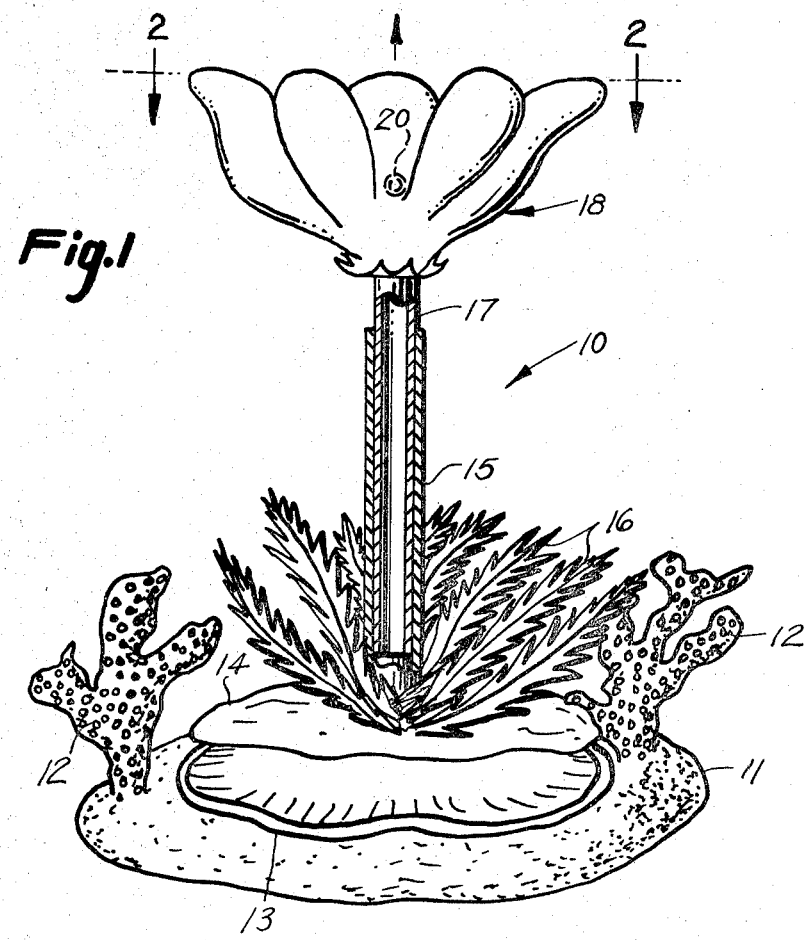
FIG. 1 is a vertical view of the present invention shown in elevation.
Figure 2:
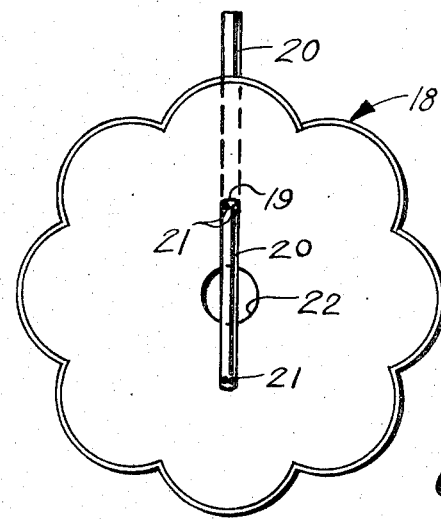
FIG. 2 is a view taken along the lines 2–2 of FIG. 1.

According to this invention, a clamshell tropical-fish feeder 10 is provided with a cement or other suitable material base 11 from which upwardly extend a pair of spaced-apart pieces of coral 12. To cement base 11 is secured fixedly a clamshell bottom half 13, the back of which is secured to the upper half 14. To the upper half 14 is secured a vertical sleeve 15 which is surrounded by decorative leaves 16, also secured to the upper half 14. A sleeve 17 is frictionally and slideably received within sleeve 15 and provides for a height adjustment for feeder 10 in order that it may be adapted to aquariums of different sizes. Attached to the upper extremity of sleeve 17 is a flowerlike configurated flower 18 in which the food for the fish is placed. An opening 19 through flower 18 carries a hollow stem 20 which extends across the interior of flower 18 and is provided with a plurality of spaced-apart openings 21 from which air leads to bubble water to aid in the feeder being self-cleaning and to also aid in funneling the food down to the shell portion of feeder 10 from which the fish feed. The stem 10 20 extends outward from flower 18 where an air hose form a suitable pump (not shown) may be secured.

It shall be noted that clamshell tropical feeder 10 may be made of synthetic materials of a nontoxic nature, if so desired.

I claim:

1. A clamshell tropical-fish feeder, comprising in combination, a cement base, an open clamshell carried by said base providing a feeding area for fish in an aquarium, coral pieces extending upwardly from said base, a bottom half of said clamshell being secured to said base, the upper half being secured to one edge of said lower half secured to said base providing a feeding area, a larger sleeve of said feeder being secured at its lower extremity to the upper half of said clamshell and being surrounded by decorative leaves, said sleeve telescopingly receiving a smaller diameter sleeve frictionally so as to permit telescopic extension or contraction for accommodating aquariums of various height, said smaller diameter sleeve telescopingly received within said larger sleeve that is secured to said clamshell, said smaller sleeve being provided with a flower shaped funnel at its upper extremity, said funnel providing cuppinglike means for receiving fish food to be directed down through said smaller diameter sleeve into said clamshell at said base, and a hollow stem extending through and reaching across the center of said flower, said stem having spaced-apart openings at the start portions thereof across said center of said flower and one end of said stem extending outward of said flower and one end of said stem extending outward of said flower for securement to an air hose of a pump.